United States Patent
Schmidtke (10) Patent No.: US 10,645,027 B2
(45) Date of Patent: May 5, 2020

(54) NETWORK SWITCHES CONFIGURED TO EMPLOY OPTICAL OR ELECTRICAL INTERFACES

(71) Applicant: Facebook, Inc., Menlo Park, CA (US)

(72) Inventor: Katharine Emily Schmidtke, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 242 days.

(21) Appl. No.: 15/716,454

(22) Filed: Sep. 26, 2017

(65) Prior Publication Data

US 2018/0097745 A1   Apr. 5, 2018

Related U.S. Application Data

(60) Provisional application No. 62/402,751, filed on Sep. 30, 2016.

(51) Int. Cl.
*H04L 12/933* (2013.01)
*H04Q 11/00* (2006.01)
*H04Q 1/28* (2006.01)

(52) U.S. Cl.
CPC ............ *H04L 49/15* (2013.01); *H04L 49/10* (2013.01); *H04Q 1/28* (2013.01); *H04Q 11/0003* (2013.01)

(58) Field of Classification Search
CPC ................................. H04L 49/15; H04Q 1/28
See application file for complete search history.

(56) References Cited

U.S. PATENT DOCUMENTS

| 5,629,836 | A | 5/1997 | Wright et al. |
| 5,729,752 | A | 3/1998 | Snider et al. |
| 5,997,326 | A | 12/1999 | Koradia et al. |
| 6,373,713 | B1 | 4/2002 | Jensen et al. |
| 6,381,146 | B1 | 4/2002 | Sevier et al. |
| 6,422,876 | B1 | 7/2002 | Fitzgerald et al. |
| 6,637,846 | B2 | 10/2003 | Yang et al. |
| 6,814,582 | B2 | 11/2004 | Vadasz et al. |
| 7,050,307 | B2 | 5/2006 | Doblar et al. |
| 7,092,642 | B2 | 8/2006 | Way et al. |
| 7,276,814 | B2 * | 10/2007 | Pozzuoli ............... G06F 1/182 307/77 |
| 7,435,095 | B1 | 10/2008 | Yi et al. |

(Continued)

FOREIGN PATENT DOCUMENTS

KR   20040050755 B1   6/2004

OTHER PUBLICATIONS

Non-Final Office Action dated Aug. 29, 2017 for U.S. Appl. No. 15/291,293 by Schmidtke, H., et al., filed Oct. 12, 2016.

(Continued)

*Primary Examiner* — William H. Mayo, III
*Assistant Examiner* — Hiram E Gonzalez
(74) *Attorney, Agent, or Firm* — Van Pelt, Yi & James LLP (57) ABSTRACT

Introduced here are several embodiments of network switch modules having interfaces designed to enable use of different voltages or currents. Accordingly, a network switch may be able to support both optical interfaces and electrical interfaces on the same printed circuit board (e.g., a line card or a fabric card). In some embodiments, the printed circuit board includes a "booster stage" electrical interface that is designed specifically for optical interfaces. Such a design enables the components of a switch to operate with both electrical interfaces and optical interfaces.

18 Claims, 6 Drawing Sheets

(56) References Cited

U.S. PATENT DOCUMENTS

| | | | |
|---|---|---|---|
| 8,154,867 | B2 | 4/2012 | Shearman et al. |
| 9,136,624 | B1 | 9/2015 | Reynov et al. |
| 9,686,886 | B2 | 7/2017 | Okada et al. |
| 2003/0080568 | A1 | 5/2003 | Busby et al. |
| 2004/0002237 | A1 | 1/2004 | Doblar et al. |
| 2004/0013104 | A1 | 1/2004 | Hesselbom |
| 2004/0047128 | A1 | 3/2004 | McClelland, II et al. |
| 2005/0105910 | A1 | 5/2005 | Light |
| 2005/0207134 | A1 | 9/2005 | Belady et al. |
| 2005/0276607 | A1 | 12/2005 | Schunk |
| 2006/0049727 | A1 | 3/2006 | Corsini et al. |
| 2006/0121421 | A1 | 6/2006 | Spitaels et al. |
| 2007/0153823 | A1* | 7/2007 | Wojtowicz ............ H04B 10/40 370/463 |
| 2007/0184676 | A1 | 8/2007 | Minich et al. |
| 2009/0093137 | A1* | 4/2009 | Badehi ................ G02B 6/4201 439/61 |
| 2011/0013348 | A1 | 1/2011 | Seibold et al. |
| 2012/0120596 | A1 | 5/2012 | Bechtolsheim et al. |
| 2013/0077968 | A1 | 3/2013 | Yang |
| 2013/0337665 | A1 | 12/2013 | Cohen et al. |
| 2014/0098492 | A1 | 4/2014 | Lam et al. |
| 2014/0169785 | A1 | 6/2014 | Roullot |
| 2014/0206273 | A1 | 7/2014 | Larsen et al. |
| 2014/0307400 | A1 | 10/2014 | French et al. |
| 2014/0362874 | A1 | 12/2014 | Nishimoto |
| 2015/0229438 | A1 | 8/2015 | Le Taillandier De Gabory et al. |
| 2016/0077556 | A1 | 3/2016 | Yang et al. |
| 2016/0128230 | A1 | 5/2016 | Dogruoz et al. |
| 2016/0197679 | A1 | 7/2016 | Tanaka et al. |
| 2017/0245030 | A1 | 8/2017 | Lyubomirsky |
| 2017/0329371 | A1 | 11/2017 | Schmidtke et al. |
| 2017/0331766 | A1 | 11/2017 | Schmidtke et al. |
| 2017/0332506 | A1 | 11/2017 | Schmidtke et al. |
| 2017/0332518 | A1 | 11/2017 | Schmidtke et al. |
| 2017/0332519 | A1 | 11/2017 | Schmidtke et al. |

OTHER PUBLICATIONS

Non-Final Office Action dated Jun. 15, 2017 for U.S. Appl. No. 15/338,255 by Lyubomirsky, I., et al., filed Oct. 28, 2016.
Notice of Allowance dated Jul. 3, 2017 of U.S. Appl. No. 15/291,313 of Schmidtke H., et al., filed Oct. 12, 2016.
U.S. Appl. No. 15/291,263 by Schmidtke, H. et al., filed Oct. 12, 2016.
U.S. Appl. No. 15/291,293 by Schmidtke, H. et al., filed Oct. 12, 2016.
U.S. Appl. No. 15/291,313 by Schmidtke, H. et al., filed Oct. 12, 2016.
U.S. Appl. No. 15/291,324 by Schmidtke, H. et al., filed Oct. 12, 2016.
U.S. Appl. No. 15/291,348 by Schmidtke, H. et al., filed Oct. 12, 2016.
U.S. Appl. No. 15/338,255 by Lyubomirsky, I., et al., filed Oct. 28, 2016.
U.S. Appl. No. 15/655,795 by Schmidtke, H. et al., filed Jul. 20, 2017.
U.S. Appl. No. 15/705,205 by Schmidtke, H. et al., filed Sep. 14, 2017.
U.S. Appl. No. 15/706,561 by Schmidtke, H. et al., filed Sep. 15, 2017.
U.S. Appl. No. 15/725,239 by Taylor, J., et al., filed Oct. 4, 2017.
Corrected Notice of Allowability dated Nov. 21, 2017 for U.S. Appl. No. 15/291,313 by Schmidtke, H., et al., filed Oct. 12, 2016.
European Perforators Association "The Advantages of Perporated Metals" Aug. 21, 2016, EUROPERF.
Non-Final Office Action dated Nov. 17, 2017 for U.S. Appl. No. 15/291,348 by Schmidtke, H., et al., filed Oct. 12, 2016.
Non-Final Office Action dated Nov. 24, 2017 for U.S. Appl. No. 15/291,263 by Schmidtke, H., et al., filed Oct. 12, 2016.
Notice of Allowance dated Dec. 6, 2017 for U.S. Appl. No. 15/291,293 by Schmidtke, H., et al., filed Oct. 12, 2016.

* cited by examiner

NETWORK SWITCHES CONFIGURED TO EMPLOY OPTICAL OR ELECTRICAL INTERFACES

CROSS-REFERENCE TO RELATED APPLICATIONS

This application claims priority to U.S. Provisional Patent Application No. 62/402,751, titled "Network Switches Configured to Employ Optical or Electrical Interfaces" and filed on Sep. 30, 2016, which is incorporated by reference herein in its entirety.

TECHNICAL FIELD

Various embodiments pertain to network switch devices and, more specifically, to network switch devices having one or more interfaces able to use different electrical voltages or electrical currents.

BACKGROUND

Data centers can house many hundreds of computing devices for the remote storage, processing, and/or distribution of data. For example, data centers associated with social networks may house many thousands of computer servers due to the high volume of data handled by social networks. These computing devices can be interconnected to themselves and client computing device(s) via various communications networks. For example, the computing devices may be connected to one another via an intranet, and to the client computing device(s) via the Internet.

Data networks allow networked computing devices to exchange data with each other using a data link. A data network may include many hundreds of networked computing devices that are connected to one another using either cable media or wireless media. Examples of networked computing devices include network switches, routers, modems, repeaters, bridges, etc.

A network switch is a computer networking device that connects other devices together on a computer network. Network switches may also be known as "switching hubs," "bridging hubs," "MAC bridges," or simply "switches." Switches are typically used in complex data networking environments to, for example, interconnect various devices within one or more subnetworks. Some switches use packet switching to receive, process, and forward data to the appropriate destination device(s). Switches could also be used for electrical switching, optical switching (which enables signals in optical fibers or integrated optical circuits to be selectively switched from one circuit to another), or a combination of electrical and optical switching.

Conventional switches include multiple printed circuit boards with associated switch circuitry whose components are interconnected via backplane circuit boards or midplane circuit boards within an enclosure. Examples of associated switch circuitry include line cards and fabric cards (collectively referred to as "cards"). A processor (also referred to as a "switch chip") can route messages or data packets between various cards. Switch chips are often implemented as application-specific integrated circuits (ASICs) that provide switch-related logic.

Both line cards and fabric cards can interconnect with computing devices via switch interfaces (also referred to simply as "interfaces"). For example, fiber optic cables can interconnect with optical interfaces, while copper-based cables can interconnect with electrical interfaces. One commonly used interface type is a small form-factor pluggable (SFP) transceiver. SFP transceivers provide computer networking devices with a modular interface that can be easily adapted to various fiber optic and copper networking standards. Accordingly, an SFP transceiver may interface the printed circuit board of a computer networking device with an optical cable or an electrical cable.

SUMMARY OF PARTICULAR EMBODIMENTS

Embodiments according to the invention are in particular disclosed in the attached claims directed to a network switch and a method for manufacturing network switches, wherein any feature mentioned in one claim category, e.g. system, can be claimed in another claim category, e.g. method, storage medium, and computer program product, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment according to the invention, a network switch may comprise:
   an optical interface;
   an electrical interface; and
   a processor operatively coupled to the optical interface and the electrical interface,
   wherein the optical interface and the electrical interface consume different amounts of electrical power despite sharing an identical power pin position.

The optical interface may include a voltage transformer circuit configured to step down voltage received at a power pin.

The electrical interface may include a voltage transformer circuit configured to step up voltage received at a power pin.

In an embodiment according to the invention, a network switch may comprise:
   a first interface having a first power pin located in a first position;
   a second interface having a second power pin located in a second position different than the first position; and
   a printed circuit board including a power component configured to controllably supply power to the first power pin of the first interface and the second power pin of the second interface.

The first interface may be an optical interface and the second interface may be an electrical interface.

The power component may be configured to:
   supply a first voltage to the first interface via the first power pin; and
   supply a second voltage to the second interface via the second power pin,
   wherein the first voltage is different than the second voltage.

The second interface may include a voltage transformer circuit.

The power component may be configured to:
supply a first current to the first interface via the first power pin; and
supply a second current to the second interface via the second power pin,
wherein the first current is different than the second current.

The second interface may include a current boost circuit.

In an embodiment according to the invention, a network switch may comprise:
a substrate onto which the first interface and the second interface are mounted,
wherein the substrate is fixedly attached to the printed circuit board.

In an embodiment according to the invention, a network switch may comprise:
a processor configured with a routing table to connect each of the first interface and the second interface with at least one other interface.

The substrate may include:
a first electrical trace that electrically interconnects the processor and the first interface; and
a second electrical trace that electrically interconnects the processor and the second interface.

The first electrical trace and the second electrical trace may be embedded within the substrate.

The first interface and the second interface may consume substantially identical amounts of electrical power because the first electrical trace is shorter than the second electrical trace.

In an embodiment according to the invention, a method, in particular for manufacturing network switches having one or more interfaces that are interoperable with optical interfaces and electrical interfaces, may comprise:
receiving a substrate suitable for electrically separating items mounted thereon;
mounting a processor to the substrate;
mounting an optical interface to the substrate;
electrically interconnecting the optical interface to the processor using a first electrical trace;
mounting an electrical interface to the substrate; and
electrically interconnecting the electrical interface to the processor using a second electrical trace;
wherein the optical interface and the electrical interface share an identical power pin position.

The first electrical trace or the second electrical trace may be at least partially exposed through the substrate.

In an embodiment according to the invention, a method may comprise:
installing a voltage transformer circuit on the optical interface,
wherein the voltage transformer circuit is configured to step down voltage received at a power pin.

In an embodiment according to the invention, a method may comprise:
installing a voltage transformer circuit on the electrical interface,
wherein the voltage transformer circuit is configured to step up voltage received at a power pin.

In an embodiment according to the invention, a method may comprise:
installing a current boost circuit on the optical interface,
wherein the current boost circuit is configured to boost current received at a power pin.

The optical interface and the electrical interface may consume substantially identical amounts of electrical power because the second electrical trace is shorter than the first electrical trace.

In an embodiment according to the invention, one or more computer-readable non-transitory storage media may embody software that is operable when executed to perform a method according to the invention or any of the above mentioned embodiments.

In an embodiment according to the invention, a system may comprise: one or more processors; and at least one memory coupled to the processors and comprising instructions executable by the processors, the processors operable when executing the instructions to perform a method according to the invention or any of the above mentioned embodiments.

In an embodiment according to the invention, a computer program product, preferably comprising a computer-readable non-transitory storage media, may be operable when executed on a data processing system to perform a method according to the invention or any of the above mentioned embodiments.

BRIEF DESCRIPTION OF THE DRAWINGS

Embodiments of network switch modules having interfaces designed to enable use of different voltages or currents (also referred to herein as simply "the embodiments") are illustrated by way of example and not limitation in the drawings, in which like references may indicate similar elements. Various features of the embodiments will become more apparent to those skilled in the art from a study of the Detailed Description in conjunction with the drawings.

The drawings depict various embodiments for the purpose of illustration only. Those skilled in the art will recognize that alternative embodiments may be employed without departing from the principles of the technology.

DETAILED DESCRIPTION

As data centers become more complex and additional computing devices and/or networking devices are added to the data centers, the power demand concomitantly increases. A maximum power capability may exist in some locations. For example, it may become impossible for a local power supplier (e.g., a power utility) to supply enough electrical power without investing in additional power generation stations. To cope with increasing data center complexity and/or computing/networking device capacity, data center operators have begun to look for ways to reduce power utilization so that the data center does not exceed the available electrical power. One opportunity to reduce power utilization is by making individual networking devices more energy efficient.

Any electrical path has an associated signal loss caused by various electrical properties of the path (e.g., resistance). For example, an electrical trace of a printed circuit board has a signal loss that is proportional to the length of the electrical trace. Similarly, a wire has a signal loss that is proportional to the length of the wire. Thus, the longer a trace or wire, the greater the signal loss. Signal loss typically manifests itself as data integrity issues. To overcome these signal losses, switch designers can reduce the length of the trace(s) or wire(s), improve the quality of the conductor(s), or increase electrical power.

Switch designers may also attempt to reduce the costs associated with manufacturing switches. One way to do so is to commoditize as many switch components as possible. For example, switches may employ "drop-in" cards that are interoperable with other similar cards. As another example, switch chips can be designed such that they are interoperable with both optical interfaces and electrical interfaces. Cards typically have optical interface(s), electrical interface(s), or both types of interface. However, because optical interfaces can have different electrical power requirements than electrical interfaces, cards are pre-designed to be specifically adapted for the type of interface the cards are intended to be used with. But this reduces manufacturers' ability to commoditize the cards.

Introduced here, therefore, are several embodiments of network switch modules having interfaces designed to enable use of different voltages or currents. Accordingly, a network switch may be able to support both optical interfaces and electrical interfaces on the same printed circuit board (e.g., a line card or a fabric card). In some embodiments, the printed circuit board includes a "booster stage" electrical interface that is designed for optical interfaces. Such a design enables the components of a switch to operate with both electrical interfaces and optical interfaces.

Terminology

Brief definitions of terms, abbreviations, and phrases used throughout the specification are given below.

References to "one embodiment" or "an embodiment" means that the particular feature, structure, or characteristic described in connection with the embodiment is included in at least one embodiment. Occurrences of such phrases are not necessarily referring to the same embodiment, nor are they necessarily referring to alternative embodiments that are mutually exclusive of one another. Moreover, various features are described that may be exhibited by some embodiments but not others.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling, either direct or indirect, between two or more elements. The coupling/ connection can be physical, logical, or a combination thereof. For example, two devices may be electrically or communicatively coupled to one another despite not sharing a physical connection.

Where the context permits, words used in the singular sense or the plural sense may also be used in the plural sense or the singular sense, respectively. When used in reference to a list of multiple items, the word "or" is intended to cover all of the following interpretations: any of the items in the list, all of the items in the list, and any combination of items in the list. If the specification states that a component/feature "may," "can," "could," or "might" be included or have a characteristic, that particular component/feature is not required to be included of have the characteristic in every embodiment.

System Topology Overview

Some data networking environments use switches with optical interconnects (also referred to as "optical switches") that employ fiber optic cables as a physical communication medium. Optical switches can house multiple cards that each receive communications from connected computing devices via one or more ports. For example, a card may have 32 ports. The ports can include front-side ports and/or back-side ports.

Front-side ports are typically used to connect to computing devices. For example, a computer server may employ a fiber optic cable to send or receive data packets to or from a line card. In such a scenario, one end of the fiber optic cable connects to a front-side port of the line card and the other end of the fiber optic cable connects to the fiber optic port interface of a data networking card of the computer server (or a different higher-level switch of the network). Back-side ports are typically used to interconnect line cards or other switches (e.g., via fabric cards).

Figure 1:
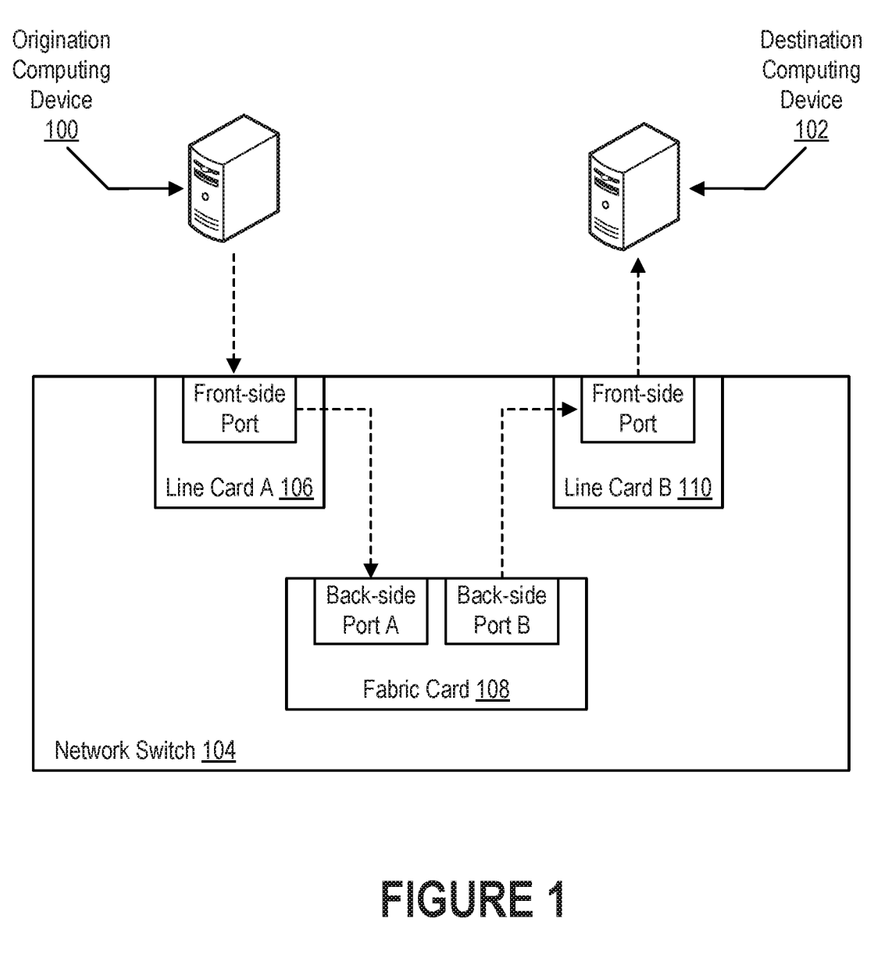
FIG. 1 is a schematic diagram illustrating an example communication flow between an origination computing device and a destination computing device via a network switch.

FIG. 1 is a schematic diagram illustrating an example communication flow between an origination computing device 100 and a destination computing device 102 via a network switch 104. The origination computing device 100 and the destination computing device 102 may be, for example, computer servers.

When the origination computing device 100 and the destination computing device 102 exchange communications via the switch 104, the corresponding data packets may travel along a specified path. Here, for example, data packets travel from the origination computing device 100 to a front-side port of a first line card 106. The first line card 106 can route the data packets to a first back-side port of a fabric card 108. After leaving the fabric card 108 via a second back-side port, the data packets may travel to a second line card 110, which routes the data packets to the destination computing device 102 via a front-side port.

These front-side ports and back-side ports (collectively referred to as "ports" or "interfaces") can be electrical or optical. However, electrical interfaces often require a different amount of electrical power than optical interfaces. Thus, a printed circuit board for a card is generally designed specifically for the type of interface that will be installed.

Each card may also include one or more processors (also referred to as "switch chips," "integrated circuits," or simply "chips") that provide switch-related logic. For example, a switch chip may create connections between the front-side ports and the back-side ports of a switch. More specifically, a switch chip may be configured with a routing table to interconnect various cards and their ports. Switch chips are typically implemented as application-specific integrated circuits (ASICs).

To reduce the power needed to overcome signal loss, several different design mechanisms can be employed. For example, the front-side ports and/or the back-side ports can be moved closer to the switch chip. By doing so, less energy is needed between the interfaces and the switch chip to address signal loss.

Figure 2:
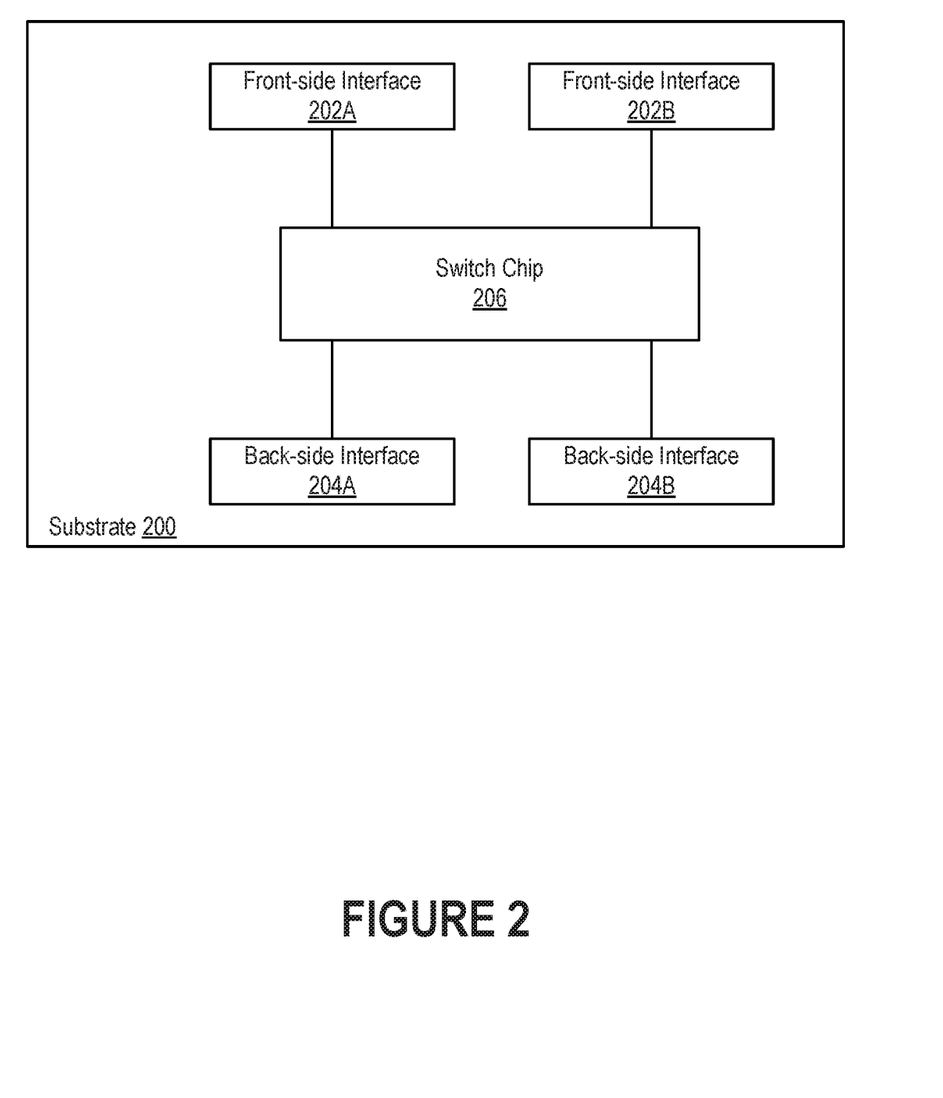
FIG. 2 is a schematic diagram of a substrate that includes front-side ports, back-side ports, and a switch chip.

Another way to reduce the required electrical power is to employ a common substrate over which the front-side port(s), back-side port(s), and switch chip are manufactured. FIG. 2 is a schematic diagram of a substrate 200 that includes front-side ports 202A-B, back-side ports 204A-B, and a switch chip 206. The substrate 200 could include any number of front-side ports 202A-B and/or back-side ports 204A-B. A module manufactured with these three types of components may be referred to as an "optimized switch controller."

An optimized switch controller can reduce (e.g., minimize) the number and/or length of traces required to interconnect these components by placing the traces on or within the substrate 200. For example, in some embodiments the traces may be embedded within the substrate 200, while in other embodiments the traces may be exposed along the surface of the substrate 200. The substrate 200 may be comprised of a ceramic or another common substrate material suitable for electrically separating the components. In some embodiments, the substrate 200 is not required. In such embodiments, the components may be mounted directly onto a printed circuit board with traces to interconnect the components.

Figure 3:
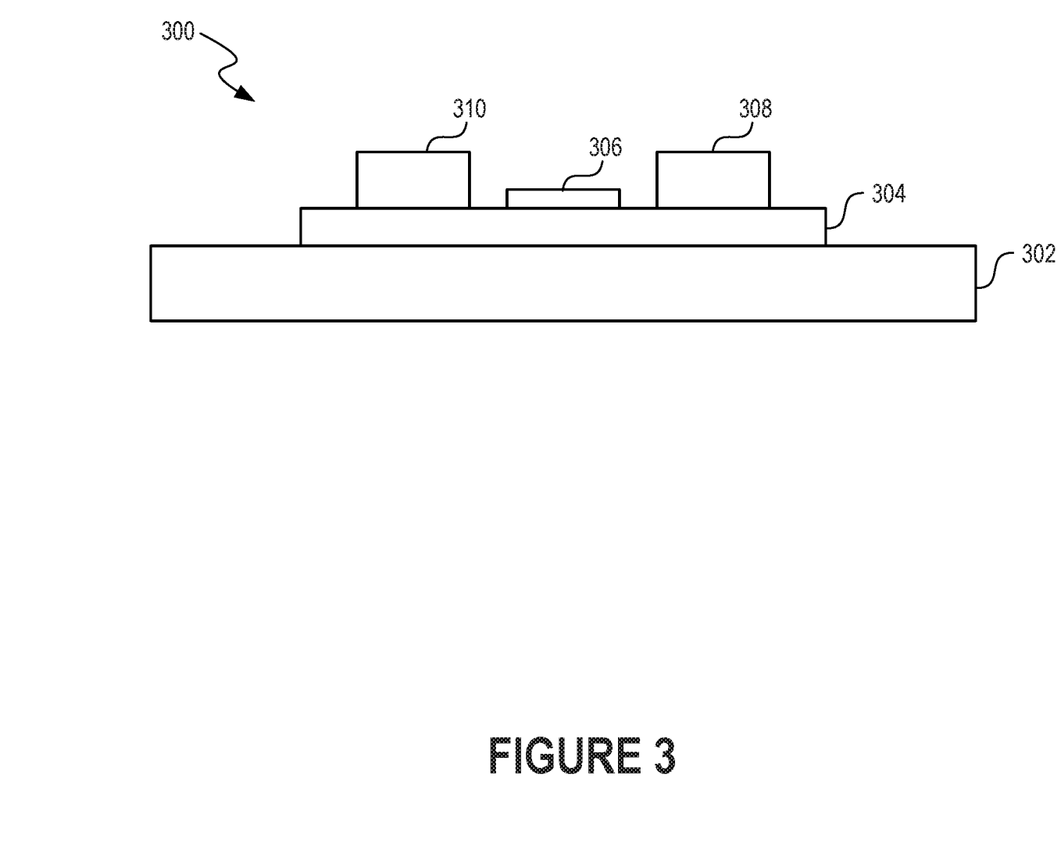
FIG. 3 is a side elevation view diagram of a printed circuit board for a switch, consistent with various embodiments.

FIG. 3, meanwhile, is a side elevation view diagram of a printed circuit board for a switch, consistent with various embodiments. A switch housing (not shown) can include various components 300. These components 300 can include one or more printed circuit boards 302 (e.g., line cards or fabric cards). Those skilled in the art will recognize that although printed circuit boards can include various components, only those pertinent to the disclosed innovations are illustrated in FIG. 3. Consequently, other common components are not illustrated.

The printed circuit board 302 can include a substrate 304. Various types of substrates can be used to electrically separate components. For example, some substrates are dielectric composite materials. The composite materials can include a matrix (e.g., an epoxy resin), a reinforcement (e.g., glass fibers or paper), and/or a resin (e.g., a ceramic).

The substrate 304 can include one or more traces (not shown) that electrically interconnect various components. Traces may be outwardly-exposed along the surface of the substrate 304 or embedded within the substrate 304 (e.g., as part of a multi-layer PC board). Here, for example, traces are used to interconnect three components: a switch chip 306, a first interface 308, and a second interface 310.

The first interface 308 can be a front-side port or a back-side port. Similarly, the second interface 310 can be a front-side port or a back-side port. The first interface 308 and the second interface 310 can be electrical interfaces or optical interfaces. As noted above, these components (e.g., the switch chip 306, first interface 308, second interface 310, and, in some embodiments, substrate 304) may collectively be referred to as an "optimized switch controller."

Several different versions of the optimized switch controller can be manufactured. For example, one version of the optimized switch controller includes an optical interface, while another version of the optimized switch controller includes an electrical interface. All other components of the optimized switch controllers may otherwise be similar or identical.

These interfaces may be manufactured with similar connector configurations (e.g., pinouts) to simplify the manufacturing process and reduce costs. For example, an optimized switch controller may include two interfaces: an optical front-side port and an electrical back-side port. The electrical back-side port would employ the power necessary for electrical (back-side) interfaces. However, if an optical back-side port were installed, the optical back-side port would employ the power necessary for optical (back-side) interfaces.

There are several principal ways to ensure an interface receives the appropriate amount of power.

Figure 4A:
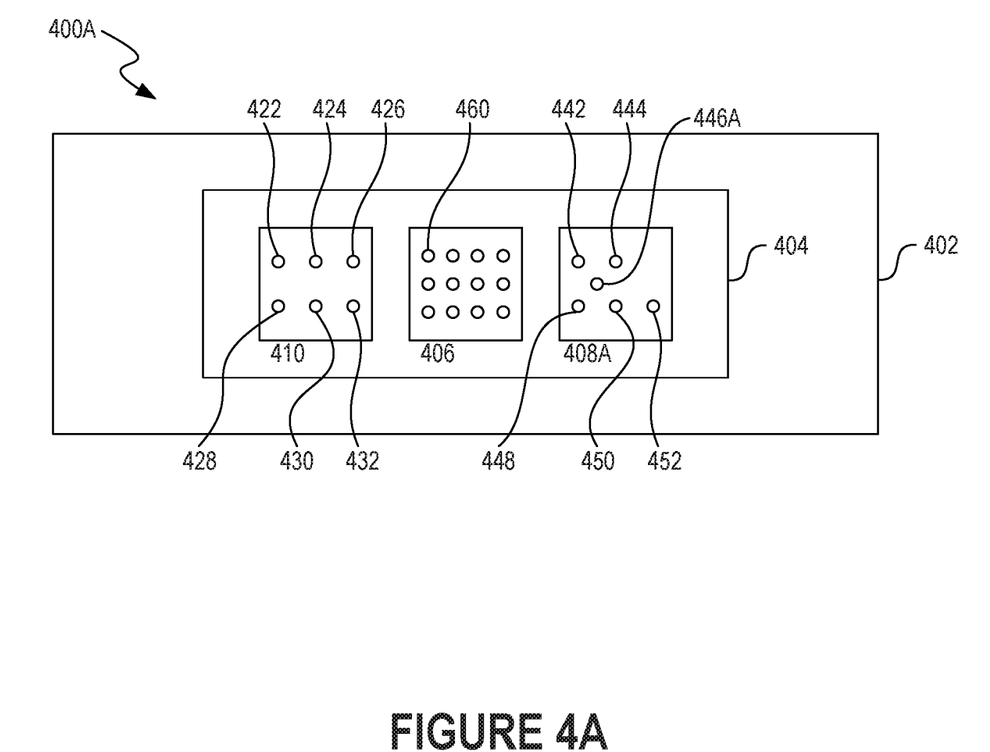
FIG. 4A is a plan view diagram of a printed circuit board and substrate similar to the printed circuit board and substrate of FIG. 3.

First, a power component can vary the power supplied at different voltage pins (or power pins) of the interface. FIG. 4A is a plan view diagram of a printed circuit board 402 and substrate 404 similar to the printed circuit board 302 and substrate 304 of FIG. 3. The components 400A may be largely identical to the components 300 of FIG. 3. Thus, switch chip 406, interface 408A, and interface 410 of FIG. 4A may correspond to switch chip 306, first interface 308, and second interface 310 of FIG. 3.

Switch chip 406 can include multiple pins 460. These pins 460 can include signaling pins and/or voltage pins. For example, the pins 460 may be used to interconnect interface 408A with interface 410.

Interface 410 can include pins 422, 424, 426, 428, 430, and 432. These pins can also include signaling pins and/or voltage pins. For example, pin 426 may be a voltage pin configured to receive a first voltage from a cable (e.g., a fiber optic cable or a copper-based cable) connected to interface 410.

Interface 408A can include pins 442, 444, 446A, 448, 450, and 452. These pins can also include signaling pins and/or voltage pins. Here, for example, pin 446A is a voltage pin configured to receive a second voltage from a cable (e.g., a fiber optic cable or a copper-based cable) connected to interface 408A. However, the second voltage received at pin 446A of interface 408A may be different than the first voltage received at pin 426 of interface 410.

If interface 408A is replaced with a new interface similar to interface 410 (e.g., having the same pinout as interface 410), then the new interface would function as designed because the voltage pin of the new interface would be in the same position as pin 426 of interface 410 (and thus in a different position than voltage pin 446A of interface 408A). Thus, the new interface can receive the necessary electrical power at its own voltage pin.

Thus, in embodiments having different voltage pins, an interface can be manufactured with a first voltage pin positioned at a first position and a second voltage pin positioned at a second position. The first voltage pin may correspond to electrical interfaces, and the second voltage pin may correspond to optical interfaces. In such embodiments, the printed circuit board could controllably supply power to both voltage pins. More specifically, the printed circuit board may supply different levels of power to the different pin positions via separate traces.

Figure 4B:
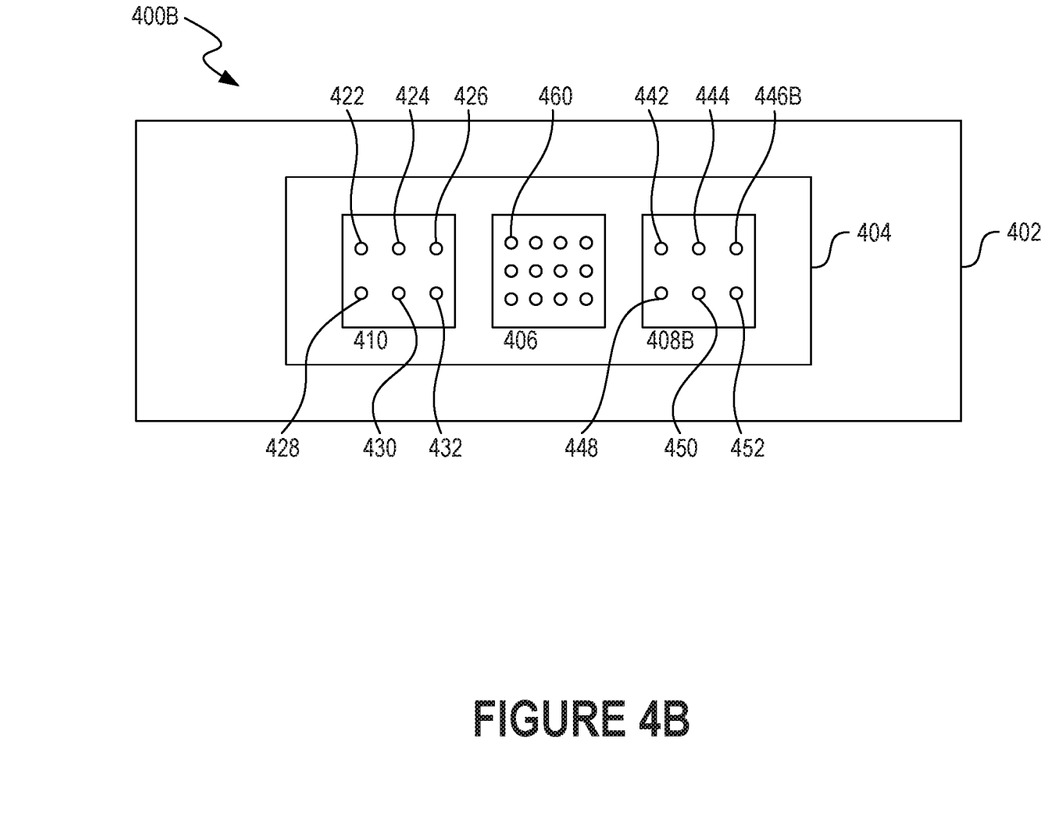
FIG. 4B is a plan view diagram of a printed circuit board and substrate similar to the printed circuit board and substrate of FIG. 3.

Second, a power transformer module can be added to the interface. FIG. 4B is a plan view diagram of a printed circuit board 402 and substrate 404 similar to the printed circuit board 302 and substrate 304 of FIG. 3. Again, the components 400B may be largely identical to the components 300 of FIG. 3. Thus, switch chip 406, interface 408B, and interface 410 of FIG. 4B may correspond to switch chip 306, first interface 308, and second interface 310 of FIG. 3.

The components 400B of FIG. 4B are similar to the components 400A of FIG. 4A. In FIG. 4B, however, voltage pin 446B of interface 408B is in the same position as voltage pin 426 of interface 410. Accordingly, interface 408B and interface 410 function at the same voltage level. If interface 408B and interface 410 are of different types (e.g., one is an electrical interface, while the other is an optical interface), then at least one of the interfaces 408B, 410 may include a power transformer module (not shown). A power transformer module may be, for example, a voltage transformer circuit able to either step up the voltage or step down the voltage received by the corresponding interface. In other embodiments, interface 408B and interface 410 consume different amounts of electrical power despite having the same relative pin positions.

In some embodiments, the voltage is constant but different amounts of current are required to overcome the resistance of the conductor lengths (e.g., trace lengths and/or cable lengths). In such embodiments, the interface may include a boost circuit (not shown) to draw additional current from the power component.

Thus, in embodiments having at least one power transformer module, either a step-down voltage transformer circuit or a step-up voltage transformer circuit could be added to the power transceiver of the interface. For example, an optical interface may include a voltage transformer configured to step down electrical power received at a voltage pin by reducing the voltage. In another embodiment, the current can be reduced. As another example, an electrical interface may include a voltage transformer circuit configured to step up electrical power received at a voltage pin by increasing the voltage or current. In some embodiments, multiple voltage transformer circuits are added to the power transceiver of the interface. One or more power transformer modules may be added, as necessary, to supply the power required by the power transceiver.

Third, an interface may employ a combination of the first and second options. For example, in some embodiments the power requirements for electrical interfaces and optical interfaces may be the same or substantially similar. In such embodiments, the pin configurations for the interfaces can be identical. An electrical interface may require the same amount of electrical power as an optical interface because, for example, the electrical interface is positioned closer to the switch chip than the optical interface. Such placement reduces the length of the electrical path between the switch chip and the electrical interface, thereby reducing signal loss. In yet other embodiments, the power requirements for electrical interfaces and optical interfaces may be different, yet the interfaces may consume different amounts of power supplied via voltage pins at the same relative positions.

One benefit of the printed circuit board designs introduced here is that they enable manufacturers to commoditize nearly all components of a switch, which will aid in significantly reducing the costs of switches.

Figure 5:
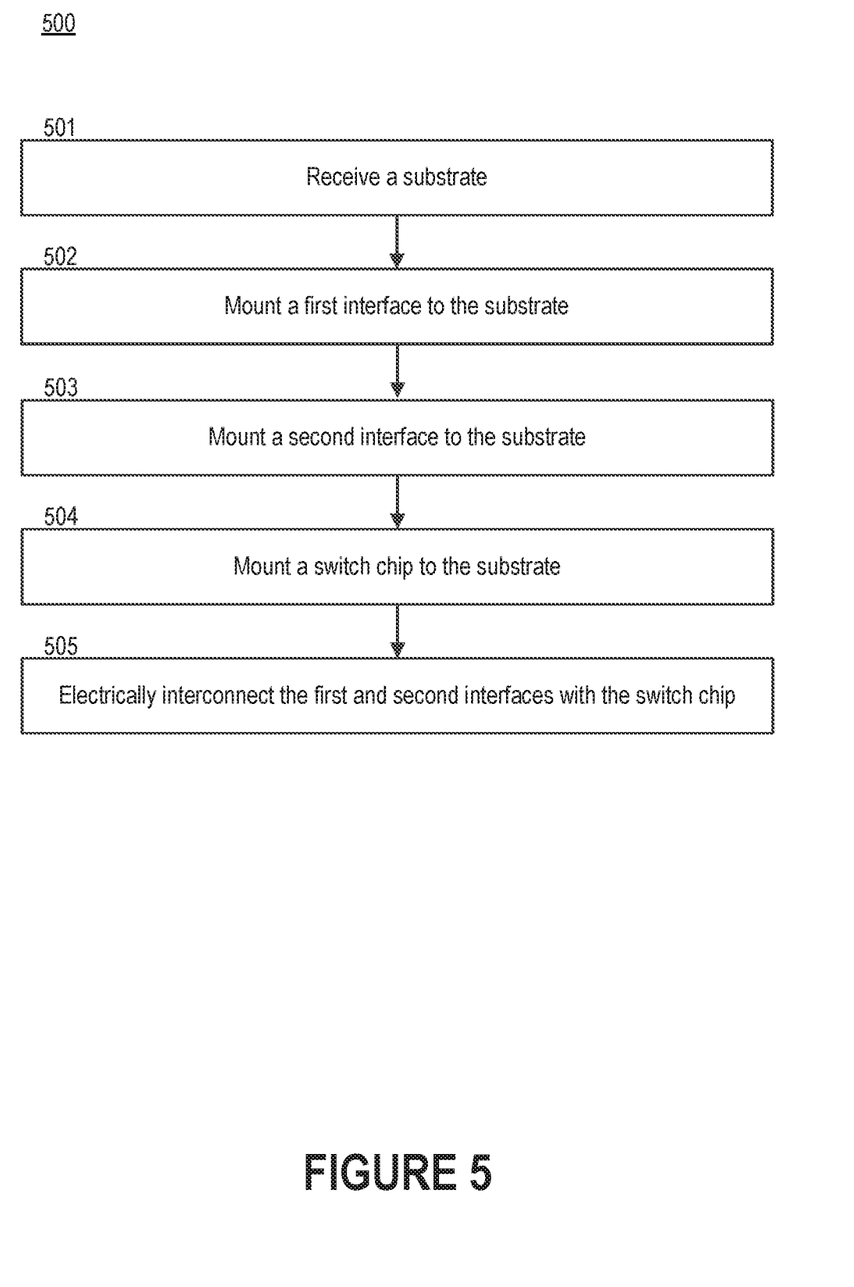
FIG. 5 depicts a process for manufacturing network switch modules having interfaces designed to enable use of different voltages or currents.

FIG. 5 depicts a process 500 for manufacturing network switch modules having interfaces designed to enable the use of different voltages or currents. A manufacturer initially receives a substrate (step 501). The substrate may be comprised of a ceramic or another common substrate material suitable for electrically separating items mounted thereon. The substrate is generally designed/selected such that the substrate can be affixed to a printed circuit board to be used within a switch.

The manufacturer can mount a first interface to the substrate (step 502). The manufacturer can also mount a second interface to the substrate (step 503). The first interface and the second interface can be electrical interfaces or optical interfaces. Fiber optic cables can interconnect with optical interfaces, while copper-based cables can interconnect with electrical interfaces.

The manufacturer can then mount a switch chip to the substrate (step 504). Switch chips are often implemented as application-specific integrated circuits (ASICs) that provide switch-related logic. The switch chip may be responsible for routing data packets between various interfaces included on the printed circuit board (e.g., between the first interface and the second interface). Thus, the manufacturer may electrically interconnect the first interface and the second interface with the switch chip using traces (step 505). In some embodiments the trace are embedded within the substrate, while in other embodiments the traces are at least partially exposed along the surface of the substrate.

As noted above, several different versions of the network switch modules can be manufactured.

One version of the network switch module includes a printed circuit board configured to controllably supply different levels of power to different pin positions via separate traces. For example, the printed circuit board may supply voltage to an electrical connector via a first voltage pin positioned at a first position and to an optical connector via a second voltage pin positioned at a second position. Network switch modules designed in such a manner can alter whether an interface acts as an electrical interface or an optical interface based on which voltage pin is currently receiving power.

Another version of the network switch module includes a voltage transformer circuit added to the power transceiver of the interface. The voltage transformer may alter whether the interface acts as an electrical interface or an optical interface by modifying (or refraining from modifying) the power received at a voltage pin. For example, an optical interface may include a voltage transformer configured to step down the power received at the voltage pin. As another example, an electrical interface may include a voltage transformer circuit configured to step up the electrical power received at the voltage pin.

Unless contrary to physical possibility, it is envisioned that the steps described above may be performed in various sequences and combinations. For example, the first interface, second interface, and switch chip may be mounted to the substrate in any order. The substrate could also be received with certain components (e.g., the first interface and the second interface) already mounted in place.

Additional steps could also be included in some embodiments. For example, the manufacturer (or some other entity) may program a computing device to automate some or all of these steps. The computing device may be communicatively coupled to an automatic-placement machine (also referred to as a "pick-and-place machine") configured to automatically place and/or secure the components onto the substrate or a printed circuit board.

Remarks

The foregoing description of various embodiments of the technology has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the technology and its practical applications, thereby enabling others skilled in the relevant art to understand the claimed subject matter, the various embodiments, and the various modifications that are suited to the particular uses contemplated.

Although the above Detailed Description describes certain embodiments and the best mode contemplated, no matter how detailed the above appears in text, the embodiments can be practiced in many ways. Details of the technology may vary considerably in its implementation details while still being encompassed by the specification. As noted above, particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments covered by the claims.

The language used in the specification has been principally selected for readability and instructional purposes, and it may not have been selected to delineate or circumscribe the inventive subject matter. It is therefore intended that the scope of the technology not be limited by this Detailed Description, but rather by any claims that issue on an application based hereon. Accordingly, the disclosure of various embodiments is intended to be illustrative, but not limiting, of the scope of the technology.

What is claimed is:

1. A network switch, comprising:
    an optical interface comprising a first plurality of pins and a first voltage transformer circuit, wherein the first plurality of pins includes a first power pin and the first voltage transformer circuit is configured to provide a step down voltage to the first power pin;
    an electrical interface comprising a second plurality of pins and a second voltage transformer circuit, wherein the second plurality of pins includes a second power pin, wherein the second voltage transformer circuit is configured to provide a step up voltage to the second power pin, wherein the first power pin is located at a same respective position within the optical interface as the second power pin within the electrical interface; and
    a processor operatively coupled to the optical interface and the electrical interface, wherein the first power pin of the optical interface and the second power pin of the electrical interface consume different amounts of electrical power despite sharing the respective power pin position.

2. A network switch, comprising:
    a first interface comprising a first plurality of pins and having a first power pin located in a first position;
    a second interface comprising a second plurality of pins and having a second power pin located in a second position different than the first position; and
    a printed circuit board including a power component configured to controllably supply power to the first power pin of the first interface and the second power pin of the second interface, wherein the power component is configured to step down voltage to the first power pin in the event the first power pin is an optical power pin and step up voltage to the second power pin in the event the second power pin is an electrical power pin.

3. The network switch of claim 2, wherein the first interface is an optical interface and the second interface is an electrical interface.

4. The network switch of claim 2, wherein the power component is configured to:
    supply a first voltage to the first interface via the first power pin; and
    supply a second voltage to the second interface via the second power pin,
    wherein the first voltage is different than the second voltage.

5. The network switch of claim 2, wherein the second interface includes a voltage transformer circuit.

6. The network switch of claim 2, wherein the power component is configured to:
    supply a first current to the first interface via the first power pin; and
    supply a second current to the second interface via the second power pin,
    wherein the first current is different than the second current.

7. The network switch of claim 6, wherein the second interface includes a current boost circuit.

8. The network switch of claim 2, further comprising:
    a substrate onto which the first interface and the second interface are mounted, wherein the substrate is fixedly attached to the printed circuit board.

9. The network switch of claim 8, further comprising:
    a processor configured with a routing table to connect each of the first interface and the second interface with at least one other interface.

10. The network switch of claim 9, wherein the substrate includes:
    a first electrical trace that electrically interconnects the processor and the first interface; and
    a second electrical trace that electrically interconnects the processor and the second interface.

11. The network switch of claim 10, wherein the first electrical trace and the second electrical trace are embedded within the substrate.

12. The network switch of claim 10, wherein the first interface and the second interface consume substantially identical amounts of electrical power because the first electrical trace is shorter than the second electrical trace.

13. A method for manufacturing network switches having one or more interfaces that are interoperable with optical interfaces and electrical interfaces, the method comprising:
    receiving a substrate suitable for electrically separating items mounted thereon;
    mounting a processor to the substrate;
    mounting an optical interface to the substrate, wherein the optical interface comprises a first plurality of pins and a first voltage transformer circuit, wherein the first plurality of pins includes a first power pin and the first voltage transformer circuit is configured to provide a step down voltage to the first power pin;
    electrically interconnecting the optical interface to the processor using a first electrical trace;
    mounting an electrical interface to the substrate, wherein the electrical interface comprises a second plurality of pins and a second voltage transformer circuit, wherein the second plurality of pins includes a second power pin, wherein the second voltage transformer circuit is configured to provide a step up voltage to the second power pin, wherein the first power pin is located at a same respective position within the optical interface as the second power pin within the electrical interface; and
    electrically interconnecting the electrical interface to the processor using a second electrical trace, wherein the optical interface and the electrical interface share the same respective power pin position.

14. The method of claim 13, wherein the first electrical trace or the second electrical trace is at least partially exposed through the substrate.

15. The method of claim 13, further comprising:
    installing the first voltage transformer circuit on the optical interface.

16. The method of claim 13, further comprising:
installing the second voltage transformer circuit on the electrical interface.

17. The method of claim 13, further comprising:
installing a current boost circuit on the optical interface, wherein the current boost circuit is configured to boost current received at a power pin.

18. The method of claim 13, wherein the optical interface and the electrical interface consume substantially identical amounts of electrical power because the second electrical trace is shorter than the first electrical trace.

* * * * *